United States Patent [19]

Skaife

[11] 4,397,114

[45] Aug. 9, 1983

[54] SOILESS GROWING SYSTEM

[75] Inventor: William A. Skaife, Solana Beach, Calif.

[73] Assignee: Margaret R. Skaife, Trustee, Solana Beach, Calif.

[21] Appl. No.: 171,499

[22] Filed: Jul. 23, 1980

Related U.S. Application Data

[63] Continuation-in-part of Ser. No. 169,673, Jul. 17, 1980, which is a continuation of Ser. No. 863,086, Dec. 22, 1977, which is a continuation of Ser. No. 704,190, Jul. 12, 1976, Pat. No. 4,100,699, which is a continuation-in-part of Ser. No. 693,637, Jun. 7, 1976, abandoned, which is a continuation of Ser. No. 577,863, May 15, 1975, Pat. No. 3,961,444.

[51] Int. Cl.³ .................................... A01G 25/00
[52] U.S. Cl. ........................................................ 47/81
[58] Field of Search ............... 47/81, 82, 80, 85, 87, 47/78–79, 59, 56, 58, 74, 63–64, 62, 48.5; 5/451

[56] References Cited

U.S. PATENT DOCUMENTS

| | | | |
|---|---|---|---|
| 3,159,413 | 12/1964 | Silverman | 47/59 |
| 3,302,325 | 2/1967 | Ferrand | 47/74 |
| 3,352,057 | 11/1967 | Ferrand | 47/62 |
| 3,375,607 | 4/1968 | Melvold | 47/74 |
| 3,624,692 | 11/1971 | Lux | 47/62 |
| 4,037,363 | 7/1977 | Baumann | 47/59 |
| 4,118,891 | 10/1978 | Kehl et al. | 47/62 X |
| 4,185,414 | 1/1980 | Miller | 47/79 |
| 4,231,187 | 11/1980 | Greenbaum | 47/59 |
| 4,251,951 | 2/1981 | Heinstedt | 47/64 X |
| 4,255,896 | 3/1981 | Carl | 47/82 X |
| 4,279,101 | 7/1981 | Leroux | 47/64 |
| 4,302,906 | 12/1981 | Kawabe et al. | 47/62 |

FOREIGN PATENT DOCUMENTS

| | | | |
|---|---|---|---|
| 314885 | 4/1974 | Austria | 47/63 |
| 2351508 | 5/1974 | Fed. Rep. of Germany | 47/64 |
| 2723435 | 12/1977 | Fed. Rep. of Germany | 47/79 |
| 1470367 | 1/1967 | France | 47/79 |
| 7508255 | 1/1976 | Netherlands | 47/74 |
| 639454 | 6/1950 | United Kingdom | 47/64 |
| 1106094 | 3/1968 | United Kingdom | 47/74 |
| 676241 | 7/1979 | U.S.S.R. | 47/62 |

OTHER PUBLICATIONS

"Hydroponics 'Peat Bag' Without the Peat", The Grower, Oct. 25, 1979, p. 25.
"Hardy Nursery Stock Production in Nutrient Film", Grower Magazine, May 4, 1974, 2 pp.

Primary Examiner—E. H. Eickholt
Attorney, Agent, or Firm—Zarley, McKee, Thomte, Voorhees & Sease

[57] ABSTRACT

A horizontal water reservoir pipe includes plant support riser pipes spaced along its length, each of which contain a growing medium in a mesh tube, extending into the water in the water pipe. The riser pipes are corrugated and provide air circulation from the atmosphere along the corrugations and between the mesh tube and the riser pipe. The growing medium may be Hasselfors peat or any other medium which has large and small pores with enough pores of large enough size to limit the saturation capillary fringe from the water table to a small fraction of the height of the growing medium and enough pores of small enough size to hold sufficient moisture in the root zone to provide abundant water for seed and plant growth. The growing medium is in communication with the atmosphere to provide for continuous entry of oxygen and escape of carbon dioxide to provide abundant oxygen for seed and plant growth.

An alternate application of the plant support riser pipes is in swamp land wherein the swamp water is the water pipe or reservoir.

A trough of plant life can be supported by the riser tubes with moisture being wicked to the growing medium in the trough by the growing medium.

14 Claims, 14 Drawing Figures

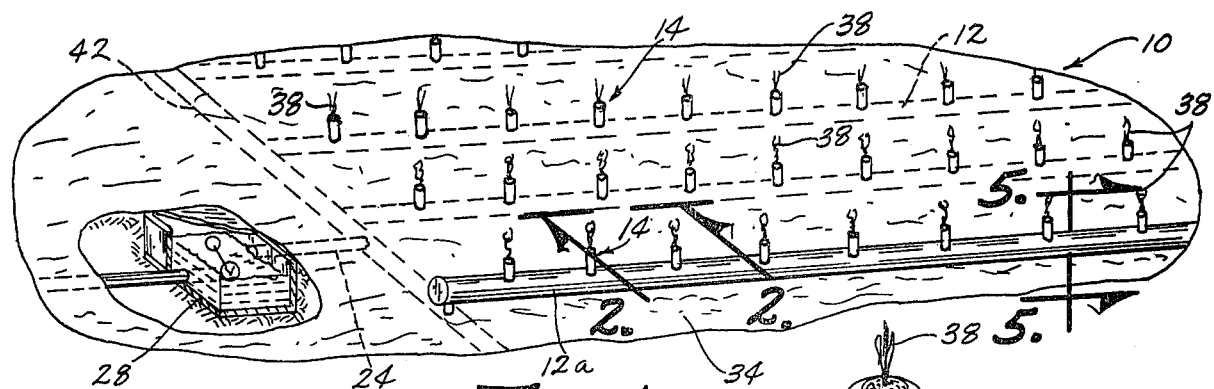
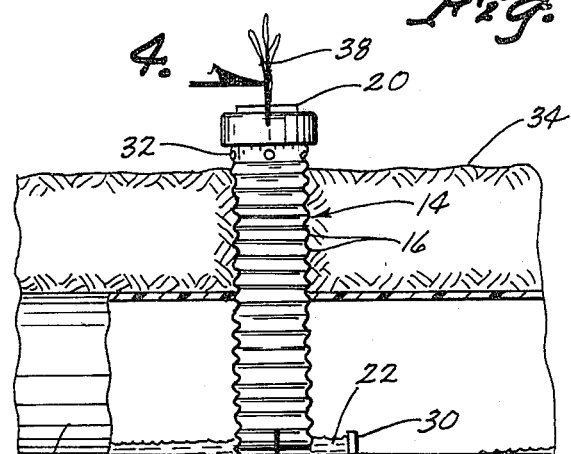
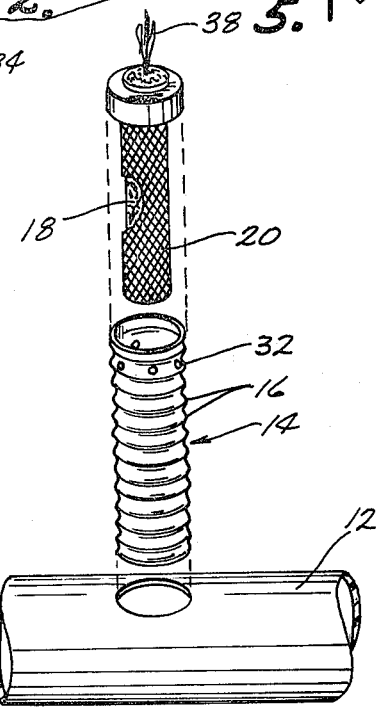
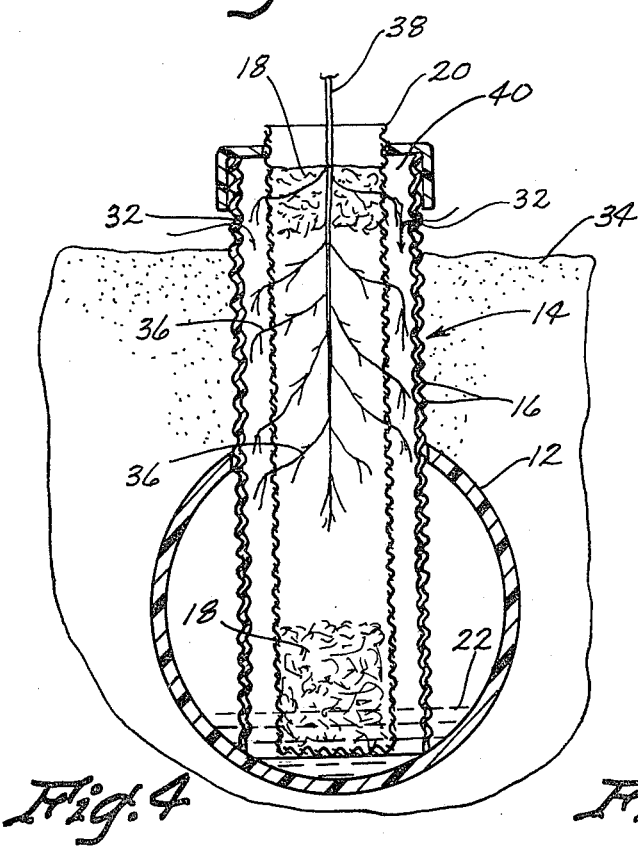

SOILESS GROWING SYSTEM

This is a continuation-in-part application of application Ser. No. 169,673, filed on July 17, 1980, which is a continuation application of application Ser. No. 863,086, Dec. 22, 1977; which is a continuation application of application Ser. No. 704,190, July 12, 1976, which issued as U.S. Pat. No. 4,100,699, July 18, 1978; which is a continuation-in-part application of application Ser. No. 693,637, June 7, 1976, now abandoned, which is a continuation of application Ser. No. 577,863, May 15, 1975, which issued as U.S. Pat. No. 3,961,444, June 8, 1976.

BACKGROUND OF THE INVENTION

The growing of decorative or food plants by the amateur or the professional heretofore has been limited by a number of factors including availability of sufficient water, satisfactory soil conditions, appropriate temperatures, sufficient manpower for controlling weeds and insects and disease, and sufficient knowledge on the part of the operator as to the individual needs of individual plants as to watering and nutrients. For instance, arid climates not only do not have enough water, but if water is supplied through irrigation the evaporation is so extensive that the cost may be prohibitive. Additionally, the application of fertilizer to provide the needed nutrients is so extensive that the cost may be prohibitive, since all fertilizer does not reach the growing plants.

Accordingly, a simplified growing system is needed that will allow amateurs and professionals alike in all parts of the world to grow all kinds of plants at a reasonable cost while using a minimum amount of water.

SUMMARY OF THE INVENTION

The growing system of this invention requires a minimum amount of water as practically all of the water consumed goes directly to the plant life with little being lost to evaporation. A minimum amount of space is occupied by the system and plants are able to grow in closer proximity to each other than under regular soil growing conditions. The system of this invention is operational totally independent of the soil conditions, amounts of rainfall or operator's knowledge of individual plants requirements for optimum growth and productivity.

Specifically, a water reservoir pipe feeds by capillary action Hasselfors peat moss in riser tubes moisture sufficient to support all plants while air circulates around the mesh inner tubes, thereby allowing the growing medium to stand in water at all times. While Hasselfors peat moss is preferred, other growing mediums may be utilized provided that they have a water table with a saturation capillary fringe and root zone thereabove, and provided that there are sufficient pores of large enough size to limit the saturation capillary fringe from said water table to a small fraction of the height of the growing medium and enough small pores to hold sufficient moisture in the root zone to provide abundant water for the seed and plant growth. Air circulation in the growing medium must be sufficient to provide for continuous entry of oxygen and escape of carbon dioxide to provide abundant oxygen for seed and plant growth.

This basic growing system is disclosed in greater detail in the parent applications, which are incorporated herein by reference.

The variables of plant type, size, rate of growth, temperature, wind, humidity, soil type, pH, fruit and flowering conditions are not a consideration with this system. The roots of each plant absorb automatically what that plant needs on an individual basis from an unlimited amount of water and nutrients. The water and fertilizer are isolated from the ground and are protected from any loss due to evaporation, run-off or leaching.

Each plant grows in its own plug and is independent of other plants in the pipes, and thus an endless variety of plants can be added and removed at will. Double and triple cropping can take place in the same spot in this pipe by simply moving one plug out and adding a new one at any time. Large transplants can be grown close together in the home or greenhouse, and then put on field spacing later with no shock whatsoever. Plants past productivity can be easily removed. Plants can be brought into a protected area overnight in the early spring and late fall when frost outdoors would kill them.

The productivity of this system is not limited to fresh food but is additionally free from weeds, herbicides and bug poisons, and is practically 100% organic. All human discretion has been removed from decisions dealing with the roots of vegetables and fruit such as soil type, watering, pH, and fertilizer. The novice grower will get the same kind of growth and productivity as the professional grower. The system is 100% automatic, requiring no daily maintenance other than keeping water in the water pipe.

The system may be on the rooftop, balcony, mountainside, or in a marsh to name just a few of the possible locations of use.

The present system is unlike hydrophonic systems in numerous respects including the fact that the plants do not remain at all times in a growing medium standing in water, but the water is cycled to the growing medium on a regular schedule, and thus the water supplied to the plants is very carefully controlled. The growing system of this invention in no way limits the amount of water reaching the growing medium as the growing medium is standing in water at all times.

One example of vegetable growing included 349 plants of varying sizes which used 600 gallons of water a week (two gallons per plant) and $3.00 of fertilizer a week (less than one cent per plant). The space requirements for large numbers of plants is very small, and a two pipe system taking up approximately 18 inches in width, will provide for low growing plants like eggplant, peppers, and zucchini in a vertical row and tall growing plants like tomatoes, cucumbers and melons in a north leaning row. A second pipe will support a trough and may be positioned on the south side of the first pipe for growing a row of lettuce, spinach and carrots. Tomatoes, for example, will grow to heights in excess of six feet, and will provide not only high productivity, but high quality and taste, comparable, if not better, than that produced by plants grown in the best of conventional soil conditions.

BRIEF DESCRIPTION OF THE DRAWINGS

FIG. 1 is a perspective view of the soiless growing system of this invention, including both above ground and in the ground water reservoir pipes, connected to a central reservoir and water pump.

FIG. 2 is a cross-sectional view taken along line 2—2 in FIG. 1.

FIG. 3 is an exploded perspective view of an individual plant support riser pipe.

FIG. 4 is a cross-sectional view taken along line 4—4 of FIG. 2.

FIG. 5 is a cross-sectional view taken along line 5—5 in FIG. 1.

DESCRIPTION OF THE PREFERRED EMBODIMENT

Figure 6:
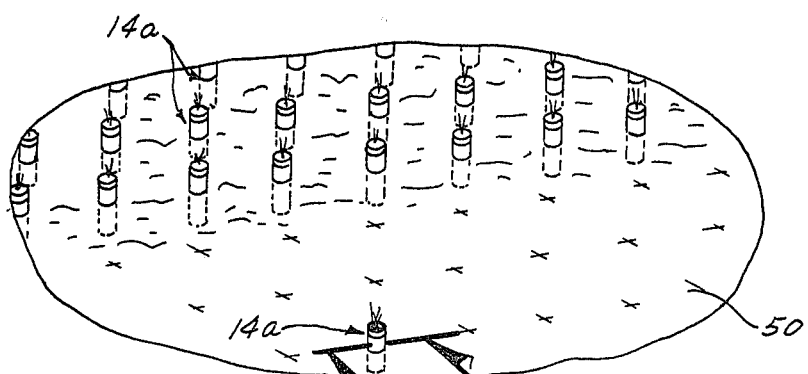
FIG. 6 is a fragmentary perspective view of the plant support riser pipes in a swamp.

The soiless growing system of this invention is referred to generally in FIG. 1 by the reference numeral 10, and includes a below-the-ground water pipe 12 having a series of spaced apart plant support riser tubes 14 as seen in detail in FIGS. 2-4. The riser tube 14 is corrugated and includes annular passageways 16 which communicate with the atmosphere to supply air to the growing medium 18 in a perforated mesh plastic tube 20. It is seen that there is sufficient space between the tube 20 and the corrugated riser pipe wall for air to circulate.

The growing medium, preferably Hasselfors peat moss, from Hasselfors, Sweden, extends into the water 22 at all times present in the pipe 12, connected by a pipe 24 to a pump and water reservoir tank 28.

Where the terrain is sloping, it may be necessary to build dams 30 into the bottom of the water pipe 12 in order to assure that sufficient water 22 is maintained around the riser pipe 14 to keep the growing medium 18 in water at all times. Air is admitted into the plant support riser pipe 14 through air holes 32 above the ground 34. The roots 36 of the plant 38 are free to grow to wherever necessary to meet their needs, including into the annular space 40 between the perforated tube 20 and the corrugated pipe 14 or downwardly into the water pipe 12 as far as they need to go to get the water they need.

In FIG. 1 it is also seen that the water pipe 12a is located on top of the ground 34 and also connects to the pump and reservoir 28 through a header 42 connecting the below ground water pipes 12. The details of the plant support riser pipe 14 and mesh tube 20 are the same.

Figure 7:
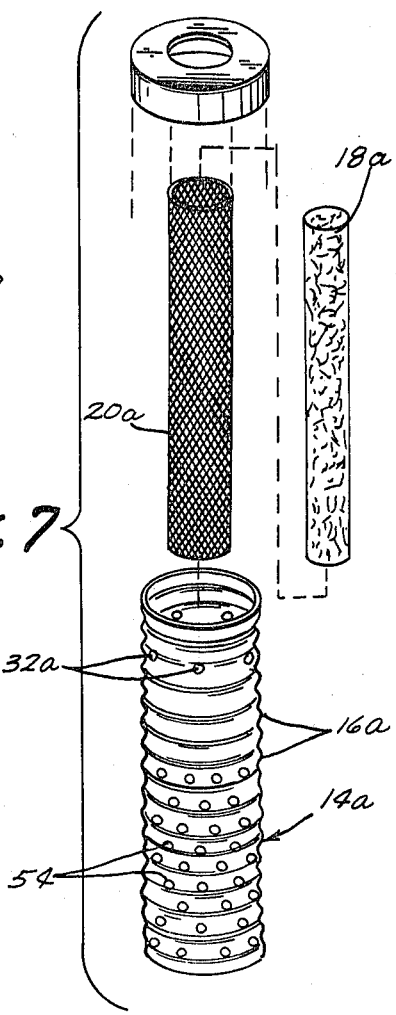
FIG. 7 is an exploded perspective view of an individual plant support riser pipe used in the swamp environment of FIG. 6.
Figure 8:
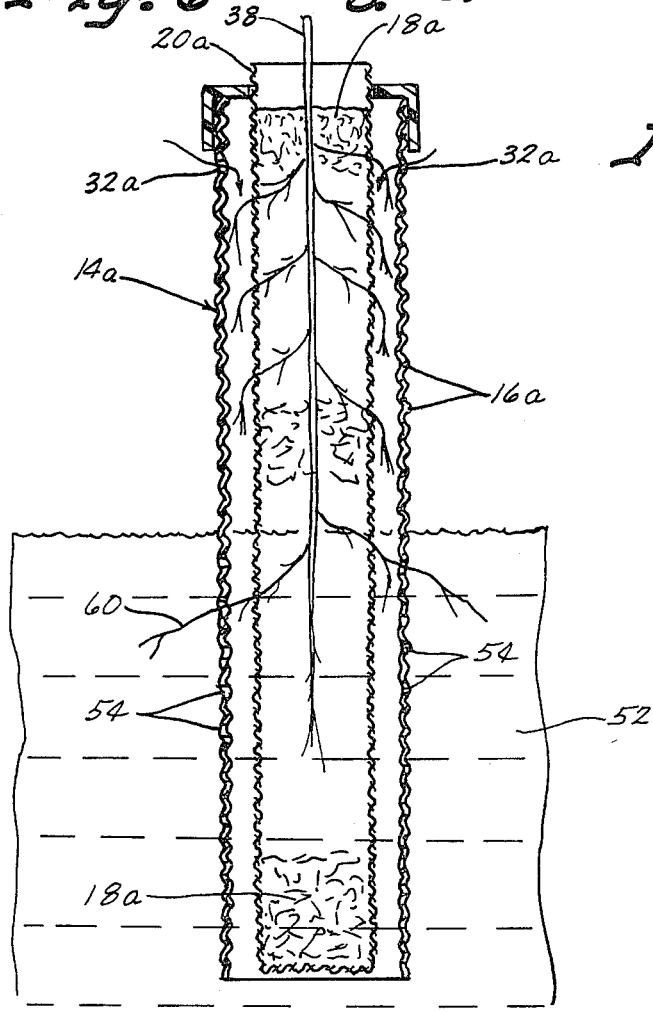
FIG. 8 is a cross-sectional view taken along line 8—8 in FIG. 6.

In FIGS. 6-8, the riser pipe assembly 14a is planted in a swamp 50 such that no water pipe is necessary with the water 52 being naturally present in the swamp and communicating with the growing medium 18a in the mesh tube 20a through openings 54 in the plant support riser pipe 14a. It is noted that the plant roots 60 are free to grow wherever they like to obtain the nutrients they need and this may include extending into the water 52 of the swamp or merely remaining in the moist growing medium 18a above the water. It is also noted that the lower end of the mesh tube 20a, as in the earlier embodiments, is closed and keeps the growing medium intact.

Figure 9:
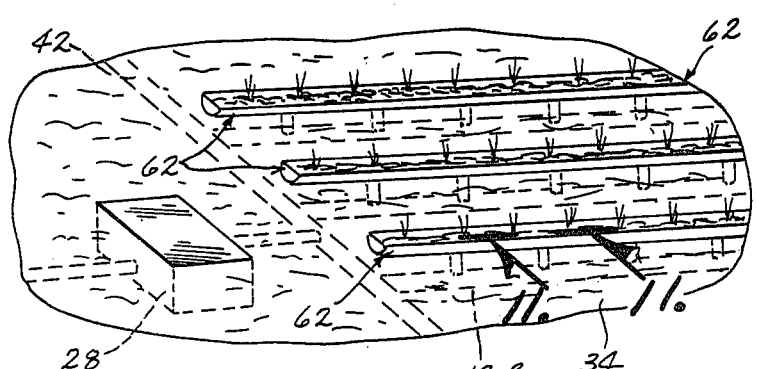
FIG. 9 is a view similar to FIG. 1, illustrating the use of troughs fed by water from the water pipes through the plant support riser pipes by capillary action occurring in the growing medium in the riser pipe.
Figure 10:
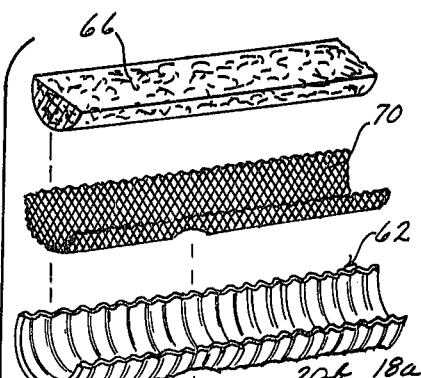
FIG. 10 is an exploded perspective view of an individual plant support riser pipe and associated trough and water pipe.
Figure 11:
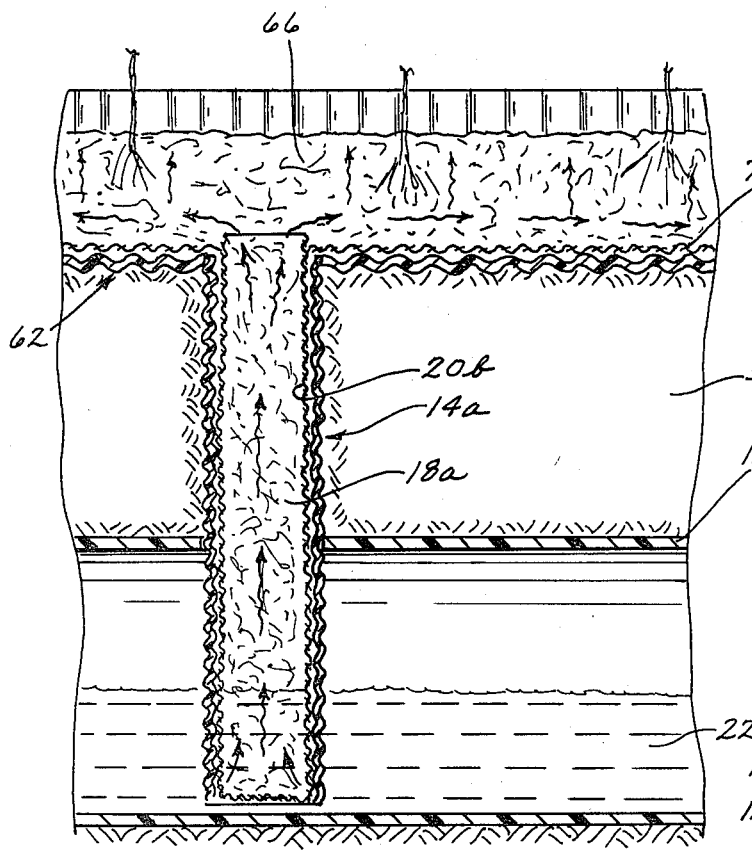
FIG. 11 is a cross-sectional view taken along line 11—11 in FIG. 9.

In FIGS. 9-11, the water supply pipe 12b buried in the ground 34 connects to an opened upwardly trough 62 through the plant support riser pipes 14a. The water 22 in the pipe 12b is wicked to the growing medium 66 in the trough 62 by the growing medium 18a in the riser pipe 14a for distribution of water through the growing medium 66.

It is seen that the corrugated trough 62 includes the mesh liner tube material 70, which exposes the growing medium 66 to sufficient air as is required for feed and plant growth.

Figure 12:
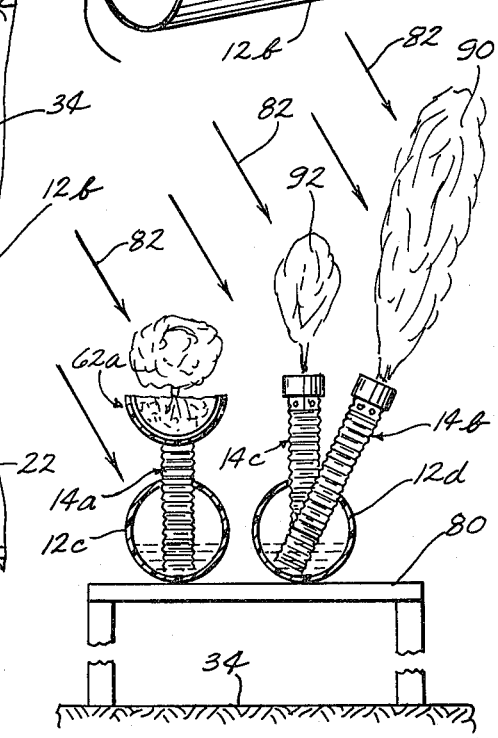
FIG. 12 is an end elevational view of a pair of water pipes supported on a stand and utilizing plant support riser pipes extending at different angles in close association with a trough unit.

In FIG. 12, it is seen that a pair of water pipes 12c and 12d are supported on a stand 80 above the ground 34 and are arranged relative to the sun 82 such that all plants short or tall have equal sunlight while the plants and equipment occupy a minimum of space. The plant support riser pipe 14b extends at an angle away from the sun and upwardly and hold the taller plants 90 while the vertical riser pipe 14c support shorter plants 92 in a stairstep fashion. The riser pipe 14d on the water pipe 12d support the trough 62a which holds the plants such as carrots and radishes suitable for growing in rows.

Figures 13, 14:
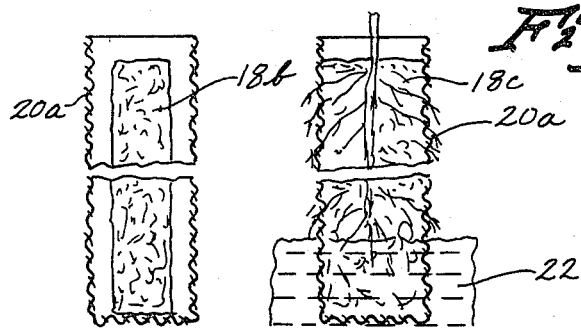
FIG. 13 is an exploded perspective view of a compressed peat moss piece in the mesh tube prior to water being applied.
FIG. 14 is a view similar to FIG. 13 after the water has been applied to the peat moss and it has expanded to fill the mesh tube.

In FIGS. 14 and 15, a strip 18b of compressed peat moss is held in a mesh tube or stocking 20a and in FIG. 14, the peat moss 18c is shown expanded after water has been applied and now substantially fills the mesh tube 20a, which has the property of being expandable as necessary as the peat moss expands.

It is understood that the water pipes may be manually filled and emptied through use of a simple fill opening and a drain tube or the like.

The soiless growing system of this invention lends itself to combining the advantages of indoor and outdoor growing, since the plants can be started in the mesh tubes indoors, and then after the last of the cold weather in the spring, the tubes may be placed in the plant support riser pipes outside. Should a cold spell hit, the mesh tubes may be removed and brought back inside until warmer weather outside returns. While inside, the tubes may be merely placed in a water container with approximately three to four inches of water in the bottom. It is further seen that outdoor growing is promoted by the conduction of heat through the black colored water pipe and plant support riser pipes which heat the water and the growing medium. The water pipe is preferably six inches in diameter, and thus has considerable area of exposure to the sun.

It is further understood that the tall growing plants such as tomatoes which will reach over six feet tall will be supported by bamboo stakes that will be inserted into the mesh tubes, and the stakes will then be interconnected by a wire or the like.

What is claimed is:

1. A soiless growing system for all seeds and plants comprising:
    an elongated water pipe horizontally disposed and continuously containing water, said pipe including a series of openings along its top side,
    a plant support riser pipe positioned in each opening,
    a perforated tube fitted with a growing medium means provided in each plant support riser pipe with the lower end of the perforated tube and growing medium means extending into the water in the water pipe,
    said growing medium means having a water table with a saturation capillary fringe and a root zone thereabove, said growing medium means having large and small pores with enough pores of large enough size to limit the saturation capillary fringe from said water table to a small fraction of the height of the growing medium and enough pores of small enough size to hold sufficient moisture in said root zone to provide abundant water for seed and plant growth, air means in communication with the growing medium means to provide for continuous entry of oxygen and an escape of carbon dioxide to provide abundant oxygen for seed and plant growth, and
    said riser plant support pipes are corrugated with annularly extending air passageways spaced along the length thereof and being in communication with the atmosphere to thereby provide air to said growing medium means through said perforated tube.

2. The system of claim 1 wherein said perforated tube and said plant support riser pipe are spaced apart sufficiently to allow air to circulate along said perforated tube between said annular air passageways and the communicating point with the atmosphere.

3. The system of claim 1 wherein said perforated tubes with growing medium and growing plants or seeds may be removed from said plant support riser pipe and relocated to an alternate location.

4. The system of claim 1 wherein said water in said water pipe contains a single fertilizer mix which feeds all the different plants and seeds growing in the system.

5. The system of claim 1 wherein said water pipe is located above ground.

6. The system of claim 1 wherein said water pipe is located in the ground with the plant support riser pipes extending above the ground.

7. The system of claim 1 and a pumping system and water reservoir are connected to said water pipe to provide a continuous supply of water to said water pipe.

8. The system of claim 7 wherein a plurality of water pipes are connected to said pumping system and water reservoir.

9. The system of claim 1 wherein said plant support riser pipes alternately extending at different angles to the vertical to provide lateral growing space for adjacent plants.

10. The system of claim 9 wherein the plants in the system include short and tall plants with the short plants being positioned in the plant support riser pipes closest to the sun.

11. The system of claim 1 wherein said water pipe and said plant support riser pipes are dark colored to absorb heat from sunlight which is conducted to said growing medium means and said water.

12. The system of claim 1 wherein said perforated tube is a mesh material having a bottom end for holding said growing medium means therein.

13. A swamp growing system for all seeds and plants comprising:
    a plurality of plant support riser pipes vertically disposed in a swamp with the upper ends of the pipes extending above the water level of the swamp,
    a growing medium means in said pipes extending from below the water level to above the water level,
    said growing medium means having a water table with a saturation capillary fringe and a root zone thereabove, said growing medium means having large and small pores with enough pores of large enough size to limit the saturation capillary fringe from said water table to a small fraction of the height of the growing medium and enough pores of small enough size to hold sufficient moisture in said root zone to provide abundant water for seed and plant growth, air means in communication with the growing medium means to provide for continuous entry of oxygen and an escape of carbon dioxide to provide abundant oxygen for seed and plant growth, and
    said riser plant support pipes are corrugated with annularly extending air passageways spaced along the length thereof and being in communication with the atmosphere to thereby provide air to said growing medium means through said perforated tube.

14. A soiless growing system for all seeds and plants comprising:
    an elongated water pipe horizontally disposed and continuously containing water, said pipe including a series of openings along its top side,
    a plant support riser pipe positioned in each opening,
    a growing medium means provided in each plant support riser pipe and extending into the water in the water pipe,
    said growing medium means having a water table with a saturation capillary fringe and a root zone thereabove, said growing medium means having large and small pores with enough pores of large enough size to limit the saturation capillary fringe from said water table to a small fraction of the height of the growing medium and enough pores of small enough size to hold sufficient moisture in said root zone to provide abundant water for seed and plant growth, air means in communication with the growing medium means to provide for continuous entry of oxygen and an escape of carbon dioxide to provide abundant oxygen for seed and plant growth, and
    said riser plant support pipes are corrugaged with annularly extending air passageways spaced along the length thereof and being in communication with the atmosphere to thereby provide air to said growing medium means through said perforated tube.

* * * * *